United States Patent
Rigali et al.

(10) Patent No.: US 6,803,003 B2
(45) Date of Patent: Oct. 12, 2004

(54) COMPOSITIONS AND METHODS FOR PREPARING MULTIPLE-COMPONENT COMPOSITE MATERIALS

(75) Inventors: Mark J. Rigali, Tucson, AZ (US); Manish P. Sutaria, Philadelphia, PA (US); Felix H. Gafner, Tucson, AZ (US); Ronald A. Cipriani, Tucson, AZ (US); Randy Egner, Tucson, AZ (US); Randy C. Cook, Tucson, AZ (US)

(73) Assignee: Advanced Ceramics Research, Inc., Tucson, AZ (US)

( * ) Notice: Subject to any disclaimer, the term of this patent is extended or adjusted under 35 U.S.C. 154(b) by 376 days.

(21) Appl. No.: 10/005,683

(22) Filed: Dec. 4, 2001

(65) Prior Publication Data

US 2002/0130434 A1 Sep. 19, 2002

Related U.S. Application Data (60) Provisional application No. 60/251,116, filed on Dec. 4, 2000.

(51) Int. Cl.[7] ............................. D01D 5/34; D01D 5/12; B29C 47/06; B29C 47/88; B22F 5/00
(52) U.S. Cl. ......................... 264/172.15; 264/173.16; 264/177.12; 264/210.8; 264/211.12; 264/211.22; 419/67
(58) Field of Search ........................... 419/67; 264/112, 264/119, 171.1, 171.3, 172.15, 173.16, 176.1, 177.16, 177.12, 211.12, 210.1, 210.8, 211.22

(56) References Cited

U.S. PATENT DOCUMENTS

| | | |
|---|---|---|
| 4,772,524 A | 9/1988 | Coblenz |
| 5,053,092 A | 10/1991 | Lachman |
| 5,175,136 A * | 12/1992 | Felthouse .................. 502/242 |
| 5,398,193 A | 3/1995 | Deangelis |
| 5,427,721 A * | 6/1995 | Brezny et al. ................ 264/44 |
| 5,588,997 A | 12/1996 | Lysson et al. |
| 5,628,938 A * | 5/1997 | Sangeeta et al. .............. 264/28 |
| 5,645,781 A | 7/1997 | Popovic' et al. |
| 5,679,157 A | 10/1997 | Milliman |
| 6,063,502 A | 5/2000 | Sue et al. |
| 6,193,001 B1 | 2/2001 | Eyre et al. |
| 6,315,065 B1 | 11/2001 | Yong et al. |
| 6,325,165 B1 | 12/2001 | Eyre |
| 6,361,873 B1 | 3/2002 | Yong et al. |
| 6,451,442 B1 | 9/2002 | Sue et al. |
| 2002/0237384 | 9/2002 | Mulligan et al. |
| 2002/0154741 A1 | 10/2002 | Rigali et al. |

FOREIGN PATENT DOCUMENTS

WO    WO 01/53059 A1    7/2001

OTHER PUBLICATIONS

J.J. Brennan and K. M. Prewo, "Silicon Carbide Fibre Reinforced Glass–Ceramic Matrix Composites Exhibiting High Strength and Toughness," *J. Mater. Sci.*, 17 2371–83 (1982).

G. Hilmas, et al., "Fibrous Monoliths: Non–Brittle Fracture from Powder–Processed Ceeramics," *Mat. Sci. & Eng.* A195, 263–268 (1995).

(List continued on next page.)

*Primary Examiner*—Stephen J. Lechert, Jr.
(74) *Attorney, Agent, or Firm*—Banner & Witcoff, Ltd.

(57) ABSTRACT

Methods for preparing fibrous monolith composite materials include continuously extruding cell and boundary material compositions. A filament is formed from a cell material composition and passed through a chamber of an extrusion assembly. A boundary material composition is extruded generally about the cell material composition filament and the two material compositions are co-extruded to form an extruded coated filament.

18 Claims, 4 Drawing Sheets

OTHER PUBLICATIONS

G.E. Hilmas, et al., "SiC and $Si_3N_4$ Fibrous Monoliths: Non–Brittle Fracture From Powder Processed Ceramics Produced by Coextrusion," vol. 51 *Ceramic Processing Science and Technology*, pp. 609–14 (1993).

H. Kodama, et al., "Silicon Carbide Monofilament–Reinforced Silicon Nitride or Silicon Carbide Matrix Composites," *J. Am. Ceram. Soc.*, 72[4] 551–58 (1989).

D. Kovar, et al., "Fibrous Monolithic Ceramics" J. Am. Ceram. Soc., 80[10] 2471–2487 (1997).

P.J. Lamicq, et al., "SiC/SiC Composite Ceramics," *Am. Ceram. Soc. Bull.*, 65 [2] 336–38 (1986).

T.I. Mah, et al., "Recent Developments in Fiber–Reinforced High Temperature Ceramic Composites," *Am. Ceram. Soc. Bull.*, 66 [2] 304–08 (1987).

K.M. Prewo, "Fiber–Reinforced Ceramics: New Opportunities for Composite Materials," *Am. Ceram. Soc. Bull.*, 68 [2] 395–400 (1989).

K.M. Prewo and J.J.Brennan, "High–Strength Silicon Carbide Fibre–Reinforced Glass–Matrix Composites," *J. Mater. Sci.*, 15 463–68 (1980).

J.R. Strife, et al., "Status of Continuous Fiber–Reinforced Ceramic Matrix Composite Processing Technology," *Ceram. Eng. Sci. Proc.*, 11 [7–8] 871–919 (1990).

PCT International Search Report mailed Feb. 25, 2003, (PCT/US02/38804).

PCT International Search Report mailed Feb. 28, 2003, (PCT/US02/38654).

PCT International Search Report mailed Mar. 6, 2003, (PCT/US02/38680).

* cited by examiner

COMPOSITIONS AND METHODS FOR PREPARING MULTIPLE-COMPONENT COMPOSITE MATERIALS

CROSS-REFERENCE TO RELATED APPLICATIONS

This application is based on, and claims the benefit of, co-pending U.S. Provisional Application Ser. No. 60/251,116, filed on Dec. 4, 2000, and entitled "Continuous Co-Extrusion Process For Fibrous Monolith Composites."

The present invention was made with U.S. Government support under grant Number NAS8-00081 awarded by the National Aeronautics and Space Administration, and grant Number N00024-97-C-4130 awarded by the Naval Sea Systems Command. Accordingly, the Government may have certain rights in the invention described herein.

FIELD OF THE INVENTION

The present invention relates to compositions for fibrous monolith ceramic and cermet composites and methods and apparatus for preparing the same.

BACKGROUND OF THE INVENTION

Monolithic ceramic materials are known to exhibit certain desirable properties, including high strength and high stiffness at elevated temperatures, resistance to chemical and environmental attack, and low density. However, monolithic ceramics have one property that greatly limits their use in stressed environments, namely their low fracture toughness. While significant advances have been made to improve the fracture toughness of monolithic ceramics, mostly through the additions of whisker and particulate reinforcements or through careful control of the microstructural morphology, they still remain extremely damage intolerant. More specifically, they are susceptible to thermal shock and will fail catastrophically when placed in severe stress applications. Even a small processing flaw or crack that develops in a stressed ceramic cannot redistribute or shed its load on a local scale. Under high stress or even mild fatigue, the crack will propagate rapidly resulting in catastrophic failure of the part in which it resides. It is this inherently brittle characteristic which can be even more pronounced at elevated temperatures, that has not allowed monolithic ceramics to be utilized in any safety-critical designs.

Continuous fiber reinforced ceramic matrix composites (CFCCs) are improved composite materials that are better suited for use in high temperature and high stress applications. The use of fiber reinforcements in the processing of ceramic and metal matrix composites is known in the prior art, and has essentially provided the fracture toughness necessary for ceramic materials to be developed for high stress, high temperature applications. See J. J. Brennan and K. M. Prewo, "High Strength Silicon Carbide Fiber Reinforced Glass-Matrix Composites," *J. Mater. Sci.*, 15 463–68 (1980); J. J. Brennan and K. M. Prewo, "Silicon Carbide Fiber Reinforced Glass-Ceramic Matrix Composites Exhibiting High Strength Toughness," *J. Mater. Sci.*, 17 2371–83 (1982); P. Lamicq, et al., "SiC/SiC Composite Ceramics," *Am. Ceram. Soc. Bull.*, 65 [2] 336-38 (1986); T. I. Mah, et al., "Recent Developments in Fiber-Reinforced High Temperature Ceramic Composites," *Am. Ceram. Soc. Bull.*, 66 [2] 304-08 (1987).; K. M. Prewo, "Fiber-Reinforced Ceramics: New Opportunities for Composite Materials," *Am. Ceram. Soc. Bull.*, 68 [2] 395–400 (1989); H. Kodama, et al., "Silicon Carbide Monofilament-Reinforced Silicon Nitride or Silicon Carbide Matrix Composites," *J. Am. Ceram. Soc.*, 72 [4] 551-58 (1989); and J. R. Strife, et al., "Status of Continuous Fiber-Reinforced Ceramic Matrix Composite Processing Technology," *Ceram. Eng. Sci. Proc.*, 11 [7–8] 871–919 (1990).

Fibrous monoliths (FMs) are a unique class of structural ceramics. They have mechanical properties similar to CFCCs, including very high fracture energies, damage tolerance, and graceful failures but can be produced at a significantly lower cost. FM composites exhibit fracture behavior similar to continuous fiber reinforced ceramic composites (CFCC), such as C/C and SiC/SiC composites, including the ability to fail in a non-catastrophic manner. Unlike CFCC's, Fibrous Monoliths are manufactured by polymer processing techniques using inexpensive raw materials. See D. Kovar, et al., "Fibrous Monolithic Ceramics" *J. Am. Ceram. Soc.*, 80, [10] 2471–2487 (1997); G. E. Hilmas, et al., "Fibrous Monoliths: Non-Brittle Fracture from Powder Processed Ceramics," *Mat. Sci. & Eng. A.*, 195, 263–268 (1995); G. E. Hilmas, et al., "SiC and $Si_3N_4$ Fibrous Monoliths: Non-Brittle Fracture From Powder Processed Ceramics Produced by Coextrusion," Vol. 51 *Ceramic Processing Science and Technology*, pp. 609–14 (1993).

Methods of processing and fabricating fibrous monolith composites are known. U.S. Pat. No. 4,772,524 discloses a process that involves coating a fugitive cotton thread with a suspension of a first component that comprises the core material and then passing the coated thread through a second suspension of second component which comprises an interface material to form a bi-component coating on the cotton fiber. These bi-component fibers are then arranged to form a green fibrous monolith body. The fibrous monolith is then sintered. U.S. Pat. No. 5,645,781 describes a process for the preparation of fibrous monoliths from green monofilament ceramic fibers that have a controlled texture. The process involves (1) blending a thermoplastic polymer with at least 40 volume % of a ceramic powder and forming a substantially cylindrical core (2) blending a thermoplastic polymer with at least 40 volume % of a ceramic powder that differs compositionally from the powder contained in the core and applying it as a layer (commonly referred to as a "shell" or "cladding") onto the core to form a substantially cylindrical feed rod (3) extruding the feed rod to form a green ceramic monofilament with a smaller diameter then that of the feed rod (4) arranging the green monofilament into a green fibrous monolith body. The green fibrous monolith body is sintered to provide a fibrous monolith.

Fibrous monolith composites prior to the present invention have traditionally been fabricated discontinuously using methods and apparatuses to fabricate a feed rod of one composition and shell of a second composition that are co-extruded using a high pressure ram extruder. Although these methods and apparatuses produce a length of green fibrous monolith filament, the length of the co-extruded filament is limited by the size and volume of the feed rod and shell. It is therefore a discrete, batch process.

Thus, there exists a need for more efficient methods and apparatuses for applying a green material coating to a green matrix filament to produce a green fibrous monolith filament to any desired length that can be formed and finished to provide a composite structure exhibiting improved mechanical properties. There exists a further need for methods and apparatuses that are versatile enough to allow almost limitless combinations of matrix and interface coatings in the co-extrusion of a fibrous monolith composite. There exists a further need for methods and apparatuses that are versatile enough to allow almost limitless combinations of matrix and continuous fibers of any type to produce a continuous fiber reinforced composite.

SUMMARY OF THE INVENTION

The present invention overcomes the problems encountered with conventional compositions and methods by providing an efficient, cost-effective process for preparing multi-component filaments. More specifically, the invention provides compositions and methods for continuous co-extrusion and fabrication of fibrous monolith composites. The methods and apparatuses of the present invention are used to fabricate composite materials via economical, versatile, and controlled continuous composite co-extrusion processes. In a preferred embodiment of the present invention, a green ceramic monofilament fiber is introduced during melt extrusion of a thermoplastic loaded ceramic and/or metal. The result of this co-extrusion process is a coextruded "green" filament containing an in-situ thermoplastic loaded ceramic and/or metal core of one composition surrounded by a uniform coating thermoplastic loaded ceramic and/or metal interface of a second composition than differs from that of the core.

More specifically, the present invention relates to continuous processes for the fabrication of a fibrous monolith composite, i.e., a composite that is comprised of a core of a material, such as a ceramic or metallic material, in an architecture that is substantially a filament that is encased in an interface boundary composed of a ceramic and/or metal material of a second composition. A plurality of these filaments are put together to form a fibrous monolith composite body. A preferred method of the present invention comprises: (a) forming first a material-laden composition comprising a thermoplastic polymer and at least about 40 volume % of a ceramic or metallic particulate; (b) melt extrusion of the first material laden composition in the form of a filament (c) forming a second material-laden composition comprising a thermoplastic polymer and at least about 40 volume % of a ceramic or metallic particulate of a different composition; (d) melt extrusion of the second material-laden composition as the filament of the first material laden composition is simultaneously pulled through an extrusion die to form a continuous green fibrous monolith filament consisting of a "green" material of the first material-laden composition that is uniformly coated by second material-laden composition (e) arranging the continuous bicomponent filament into a desired architecture to provide a green fibrous monolith composite. The green composite may be subsequently fired, i.e., heated, to provide a fully consolidated and densified fibrous monolith composite with non-brittle failure characteristics.

The present invention also provides a process for the fabrication of a continuous fiber reinforced composite, i.e. a composite that is comprised of a matrix of material, such as a ceramic or metallic material, having fibers of a ceramic material dispersed within the matrix as a reinforcement. The process for forming a CFCC is (a) forming first a material-laden composition comprising a thermoplastic polymer and at least about 40 volume % of a ceramic or metallic particulate; (b) melt extrusion of the a material-laden composition while simultaneously pulling a ceramic fiber or fiber tow through an extrusion die; (c) arranging the continuous bicomponent filament into a desired architecture to provide a green fiber reinforced composite. The green composite may be subsequently fired, i.e., heated, to provide a fiber reinforced composite with non-brittle failure characteristics.

The present invention further provides methods for the fabrication of continuous filaments used in preparing fiber reinforced composites wherein the architecture of the filaments can be readily controlled.

Yet another aspect of the present invention is the ability to form the green filaments into a shaped green-body having a desired architecture. As one example, the extruded filament is molded by pressing into an appropriate mold at temperature of at least about 80° C. The molding operation joins the green filaments together, creating a solid, shaped green body. Any shape that can be compression molded or otherwise formed by plastic deformation can be obtained with the extruded green filament. The green body so molded has the desired texture created by the arrangement of the extruded filaments. For example, a uniaxially aligned fibrous monolith composite can be obtained by a uniaxial lay-up of the extruded filaments prior to molding, or a woven architecture can be obtained by molding a shape from previously woven extruded filaments. The extruded filament product permits a wide variety of composite architectures to be fabricated in a molded green body.

In a preferred method of the present invention, a co-axial filament is produced with a green fiber core of a first material laden composition surrounded by a green coating of a second material laden composition.

The processing techniques of the invention readily allow for control of the fiber core and coating volume fraction and changes to the matrix composition. This technology is readily applicable to other matrix/fiber combinations and significantly enhances manufacturing capabilities for low cost, high-performance and high temperature ceramic composites.

BRIEF DESCRIPTION OF THE DRAWINGS

FIG. 5b is a side elevational view of the die of FIG. 5a.

DETAILED DESCRIPTION OF THE INVENTION

The present invention relates to compositions and methods for preparing composite materials exhibiting mechanical properties including high hardness, fracture toughness, damage tolerance, wear and abrasion resistance, thermal shock resistance, and/or corrosion resistance. Specifically, the methods and apparatus of the present invention can be used to prepare ceramic and/or metallic filaments having a core of a first material laden composition encased by a second material laden composition. The filaments can be formed into fibrous monolith ceramic or metal composites.

The composites of the present invention are combinations of two or more materials present as separate phases and combined to form desired structures so as to take advantage of certain desirable properties of each component. The materials can be organic, inorganic, or metallic, and in various forms, including but not limited to particles, rods, fibers, plates and foams. Thus, a composite, as defined herein, although made up of other materials, can be considered to be a new and different material have characteristic properties that are derived from its constituents, from its processing, and from its microstructure.

Composites are made up of the continuous matrix phase in which are embedded: (1) a three-dimensional distribution of randomly oriented reinforcing elements, e.g., a particulate-filled composite; (2) a two-dimensional distribution of randomly oriented elements, e.g., a chopped fiber mat; (3) an ordered two-dimensional structure of high symmetry in the plane of the structure, e.g., an impregnated cloth structure; or (4) a highly-aligned array of parallel fibers randomly distributed normal to the fiber directions, e.g., a filament-wound structure, or a pre-impregnated sheet consisting of parallel rows of fibers impregnated with a matrix.

Figure 1:
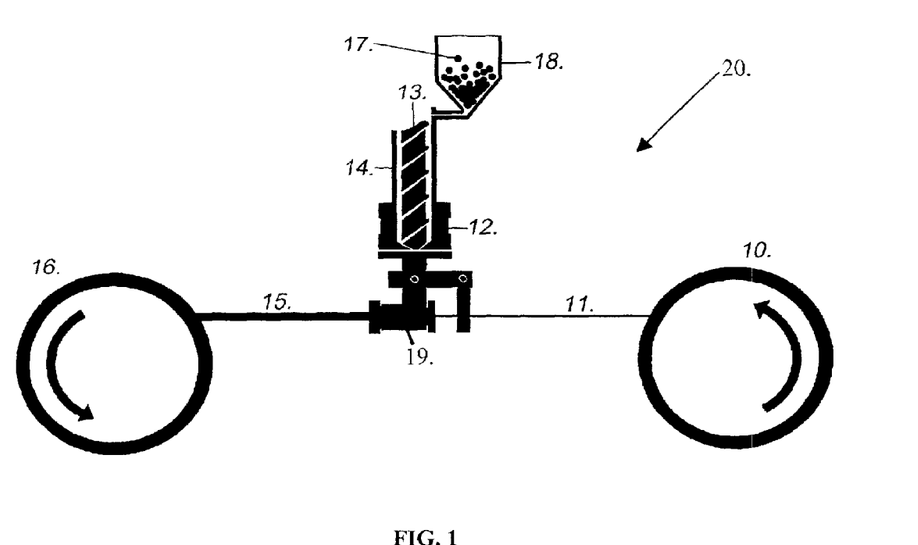
FIG. 1 is a schematic illustration of a preferred apparatus of the present invention.
Figure 2:
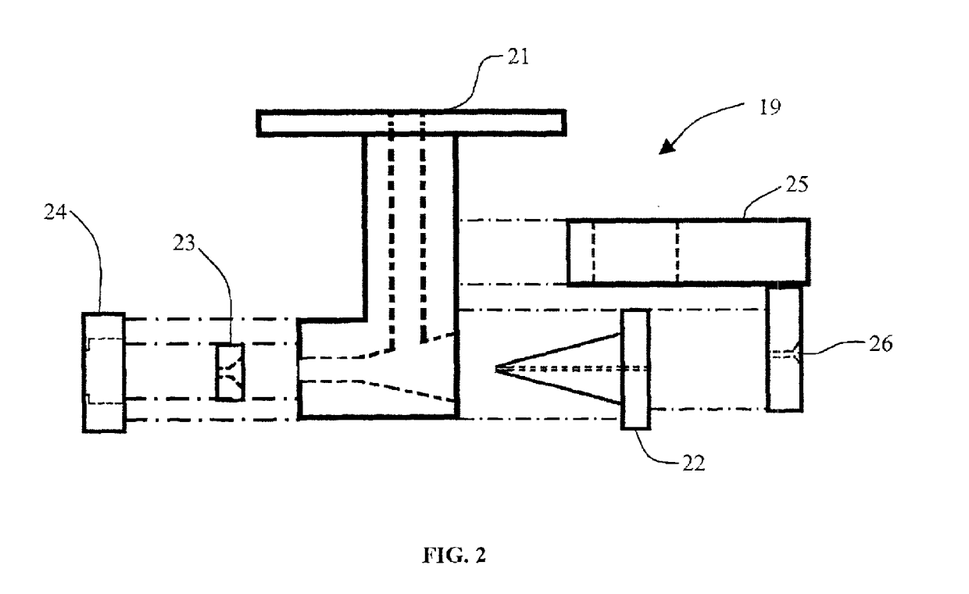
FIG. 2 is an exploded view of extrusion assembly of the apparatus of FIG. 1.

Referring to FIG. 1, there is illustrated an apparatus for preparing multi-component composite materials embodying the features of the present invention. The preferred assembly generally includes a winding spool 10, a green filament or ceramic fiber or fiber tow 11, a material hopper 18, a material laden composition 17, an extruder screw 13, a heating jacket 12, an extruder body 14, an extrusion assembly 19, a coated fibrous monolith green filament 15, and a motor driven uptake spool 16. Referring also to FIG. 2, there is also illustrated a detailed view of the extrusion assembly 19 of the preferred apparatus of the present invention. The extrusion assembly 19 has an extrusion head 21, a tapered nozzle 22, a spinnerette 26, a spinnerette housing 25, a guide rod support 24, and a guide rod 23.

As used herein, "fibrous monolithic composite" and "fibrous monolith" are intended to mean a ceramic and/or metallic composite material that includes a plurality of monolithic fibers, or filaments, each having at least a cell phase surrounded by a boundary phase but may include more than one core and/or shell phase. Fibrous monoliths exhibit the characteristic of non-brittle fracture, such that they provide for non-catastrophic failure.

As used herein, "cell phase" is intended to mean a centrally located primary material of the monolithic fiber, that is dense, and relatively hard and/or strong. The cell phase extends axially through the length of the fiber, and, when the fiber is viewed in transverse cross-section, the cell phase forms the core of the fiber. The "cell phase" also may be referred to as a "cell" or "core".

As used herein, "boundary phase" is intended to mean a more ductile and/or weaker material that surrounds the cell phase of a monolithic fiber in a relatively thin layer and that is disposed between the various individual cell phases, forming a separating layer between the cell phase and surrounding cell phases when a plurality of fibers are formed in a fibrous monolithic composite. The "boundary phase" also may be referred to as a "shell," "cell boundary" or "boundary".

Figure 3:
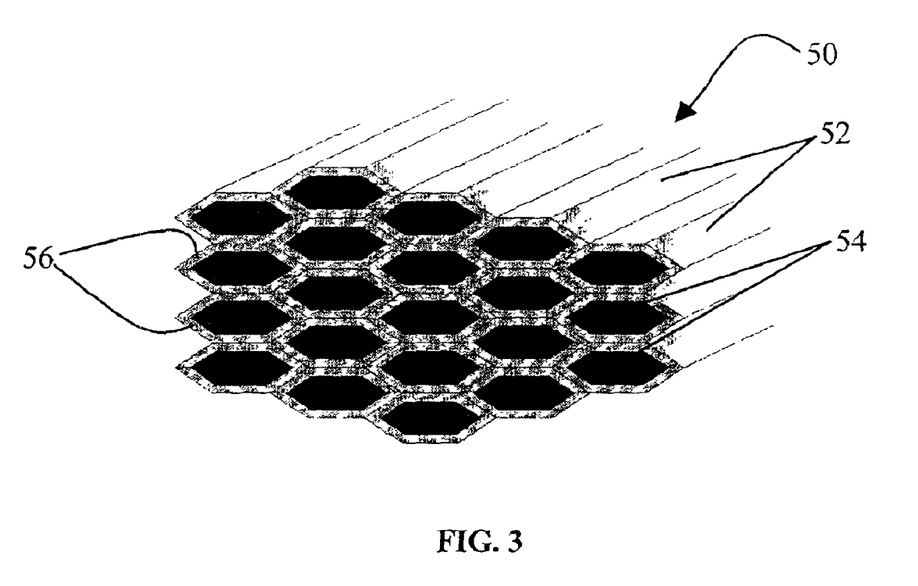
FIG. 3 is a perspective cross-sectional view of a uniaxial fibrous monolith composite in accordance with the present invention.

As shown in FIG. 3, the macroarchitecture of a FM composite 50 generally includes multiple filaments 52 each comprising at least two distinct materials—a primary phase in the form of elongated polycrystalline cells 54 separated by a thin secondary phase in the form of cell boundaries 56. Typical volume fractions of the two phases are between about 50 to about 99% of the fiber for the primary phase (polycrystalline cell) and between about 1 to about 50% of the fiber for the interpenetrating phase (cell boundary). Preferably, the volume fractions are between about 80 to about 95% for the primary phase (polycrystalline cell) and between about 5 to about 20% for the interpenetrating phase (cell boundary). The primary or cell phase typically consists of a structural material of a metal, metal alloy, carbide, nitride, boride, oxide, phosphate or silicide and combination thereof. The cells are individually surrounded and separated by cell boundaries of a tailored secondary phase. Powders that may be used in the secondary phase include compounds to create weak interfaces such as fluoromica, and lanthanum phosphate; compounds to create porosity in a layer which function to create a weak interface; graphite powders and graphite-containing powder mixtures; and hexagonal boron nitride powder and boron nitride-containing powder mixtures. If a metallic debond phase is desired, reducible oxides of metals may be used, e.g., nickel and iron oxides, or powders of metals, e.g., nickel, iron, cobalt, tungsten, aluminum, niobium, silver, rhenium, chromium, or their alloys.

Advantageously, powders which may be used in the cell and/or boundary phase composition to provide the green matrix filament include diamond, graphite, ceramic oxides, ceramic carbides, ceramic nitrides, ceramic borides, ceramic suicides, metals, and intermetallics. Preferred powders for use in that composition include aluminum oxides, barium oxides, beryllium oxides, calcium oxides, cobalt oxides, chromium oxides, dysprosium oxides and other rare earth oxides, hafnium oxides, lanthanum oxides, magnesium oxides, manganese oxides, niobium oxides, nickel oxides, tin oxides, aluminum phosphate, yttrium phosphate, lead oxides, lead titanate, lead zirconate, silicon oxides and silicates, thorium oxides, titanium oxides and titanates, uranium oxides, yttrium oxides, yttrium aluminate, zirconium oxides and their alloys; boron carbides, iron carbides, hafnium carbides, molybdenum carbides, silicon carbides, tantalum carbides, titanium carbides, uranium carbides, tungsten carbides, zirconium carbides; aluminum nitrides, cubic boron nitrides, hexagonal boron nitrides, hafnium nitride, silicon nitrides, titanium nitrides, uranium nitrides, yttrium nitrides, zirconium nitrides; aluminum boride, hafnium boride, molybdenum boride, titanium boride, zirconium boride; molybdenum disilicide; lithium and other alkali metals and their alloys; magnesium and other alkali earth metals and their alloys; titanium, iron, nickel, chromium, cobalt, molybdenum, tungsten, hafnium, rhenium, rhodium, niobium, tantalum, iridium, platinum, zirconium, palladium and other transition metals and their alloys; cerium, ytterbium and other rare earth metals and their alloys; aluminum; carbon; lead; tin; and silicon.

Compositions comprising the cell phase differ from those comprising the boundary phase in order to provide the benefits generally associated with FMs. For example, the compositions may include formulations of different compounds (e.g., HfC for the cell phase and WRe for the boundary phase or WC—Co and W—Ni—Fe) or formulations of the same compounds but in different amounts (e.g., WC-3% Co for the cell phase and WC-6% Co for the boundary phase) as long as the overall properties of the compositions are not the same. For example, the compositions can be selected so that no excessively strong bonding occurs between the two phases in order to limit crack deflection.

The cell boundary phase may be selected to create pressure zones, microcrack zones, ductile-phase zones, or weak debond-type interfaces in order to increase the toughness of the composite. For example, low-shear-strength materials such as graphite and hexagonal boron nitride make excellent weak debond-type cell boundaries and are present in $Si_3N_4$/BN and SiC/Graphite FM composites. The weak BN and graphite interfaces deflect cracks and delaminate thereby preventing brittle failure of these composites and increasing their fracture toughness. As a result, FM structures exhibit fracture behavior similar to CFCCs, such as C/C and SiC/SiC composites, including the ability to fail in a non-catastrophic manner. By way of example, typical flexural stress as a function of displacement for a $Si_3Ni_4$/BN FM material is shown in FIG. 2, which illustrates that fibrous monolith composites are non-brittle and retain significant load bearing capability after fracturing is initiated.

Low shear strength cell boundaries, such as BN and graphite, accommodate the expansions and contractions that occur during thermal cycling of the FM composite components, thereby resulting in improved thermal shock resistance. From the mechanical behavior viewpoint, such cell boundaries enable non-catastrophic failure due to stress delocalization and crack deflection mechanisms at both room and elevated temperatures. In addition, the presence of a ductile or relatively ductile cell boundary phase increases the damage tolerance and wear resistance of the FM composite. Without intending to be limited by any theories, it is believed that the improvement in damage tolerance of the present composites is attributed to the FM architecture in which the cell boundary absorbs and deflects crack energy during impact so that damage, when it occurs, is isolated to the individual micron-sized cells.

Fibrous monolith composites are fabricated using commercially available ceramic and metal powders using a process for converting ordinary ceramic and/or metal powder into a "green" fiber that include the powder, a thermoplastic polymer binder and other processing aids. The fiber is compacted into the "green" state to create the fabric of elongated polycrystalline cells that resemble a fiber after sintering or hot pressing. The process is widely applicable, and allows a cell/cell boundary bi-component fiber to be made from a thermodynamically compatible set of materials available as sinterable powders. The scale of the microstructure is determined by the green fiber diameter (cell size) and coating thickness (cell boundary). Once the green composite fiber is fabricated it can be formed using any method known to those skilled in the art into the shape of the desired component having, for example, conventional composite architecture (e.g., uniaxial lay-up, biaxial lay-up, woven fabric, etc.). The thermoplastic binder is removed in a binder burnout step, and the component is hot pressed or sintered to obtain a fully consolidated and densified component.

The core and shell of the feed rod are formed of mechanically activated and agglomerate-free powders. The ceramic powders, such as the metals, alloys, carbides, nitrides, borides, oxides, phosphates and suicides listed above, are selected to provide the desired mechanical properties in the final composite. A wide variety of combinations of powders may be used for the core and shell materials. Powders having particle size distributions in the range of about 0.01 to about 100 microns ($\mu$m) in size may be used. Preferably, the particle size of the powder is between about 1 to about 10 microns.

Milling stations such as commercially available from Boston Gear, Boston, Mass. may be used as needed to ball mill the ceramic powder to obtain the desired size distribution. The desired ceramic powder preferably is ball milled with ethanol. The ceramic/ethanol blend is ball milled with milling media such as silicon nitride ($Si_3N_4$) or zirconium oxide ($ZrO_2$) thus creating a ball-mill slurry. Sintering aids such as, for example, aluminum oxide ($Al_2O_3$) and yttrium oxide ($Y_2O_3$) additions to $Si_3N_4$, when necessary, are added and milled together with the ball mill slurry. The powders are milled for a time effective for providing desired particle sizes and distribution. Typical milling times are between about 24 to about 120 hours, depending on the starting ceramic material. For example, boron nitride (BN) powder is milled for about 12 to 24 hours, silicon nitride powder is milled for about 24 hours, and zirconium carbide (ZrC), purchased as a fairly coarse refractory ceramic, is typically milled for a longer period, about 72 to 120 hours.

Upon completion of the milling operation, the ball mill slurry is collected from the milling station and the ceramic/ethanol mixture is separated from the milling media using a perforated mill jar lid as a "strainer". The ethanol is separated from the ceramic powder using a Buchi Rotavapor separator commercially available from Brinkman Instruments Inc. of Westbury, N.Y. Solvent is evaporated from the ball-milled slurry in the Buchi Rotavapor separator and the ceramic powder dried. Ethanol solvent may be reclaimed as desired for reuse or proper disposal according to local, state, and federal waste disposal requirements. The ceramic powders are removed from the separator jar and placed in labeled plastic jars.

The individual ceramic powders are blended with thermoplastic melt-spinnable polymer binders, as well as one or more processing aids such as plasticizers as necessary, using a high shear mixer commercially available from C. W. Brabender of South Hackensack, N.J. or from Thermo Haake of Paramus, N.J., to form a smooth, uniformly suspended composite blend also referred to as a "dope". Examples of thermoplastic binders include ethylene ethylacetate (EEA) commercially available as DPDA-618NT from Union Carbide, ethylene vinylacetate (EVA) commercially available as ELVAX 470 from E. I. DuPont Co., and Acryloid Copolymer Resin (B-67) commercially available from Rohm and Haas, Philadelphia, Pa. Examples of plasticizers include heavy mineral oil (HMO) commercially available as Mineral Oil White, Heavy, Labguard® and methoxy polyethyleneglycol having a molecular weight of about 550 (MPEG-550) commercially available from Union Carbide. The composite blend is compounded at about 150° C. while metering a viscosity-modifying additive until a viscosity is obtained that will ensure desired rheology for a molten fiber extrusion process.

Because the mixers have fixed volume reservoirs, the recipes for the thermoplastic/ceramic blends produced in batches are formulated on a volumetric, as opposed to a gravimetric, basis. As an example, one blend consists of between about 50 to about 62 vol. % of the ceramic powder, between about 37 to about 50 vol. % of the thermoplastics, and between about 0 to about 12 vol. % of the plasticizers. Thus, the mass of a batch of ceramic/thermoplastic dope varies with the density of the ceramic powder. By way of example, a batch of $Si_3N_4$ with a density of 3.44 g/cc produces approximately 1 kg of "green" compound material.

After mixing, the composite blend of the core filament is formed into a filament using any method known to those of skill in the art. Preferably, the composite blend is extruded to form the filament 11. The filament can be wound around the winding spool 10 after preparation to assist with material handling.

The extruded core filament 11 is passed through the continuous composite co-extrusion assembly 19. From the spool 10, the filament 11 is extruded through the spinnerette 26 and passed to the tapered nozzle 22.

Concurrent with the filament 11 being passed through the extrusion assembly 19, the material laden composition 17 for the shell is fed through the hopper 18 to the extruder screw 13. A heating jacket 12 is heated to a temperature effective for softening the material laden composition 17 as it passes through the extruder so that it becomes a workable composition. Heating can be eliminated if the compositions are workable at room temperature. The extruder screw 13 pushes the composition 17 through the extruder body 14 past the heating jacket 12 into the extrusion head 21. As the composition 17 moves through the extrusion die head 21 and into the tapered nozzle 22, the filament 11 is pulled through the melted composition 17 in the tapered nozzle 22. The melted composition 17 coats the filament 11 which, upon cooling provides a coated fibrous monolith green filament 15, wherein the first filament 11 is the core and the composition 17 is the shell. The green filament 15 is supported by the guide rod 23 as it is passed to the uptake spool 16.

Typical filament sizes are 100 $\mu$m, 250 $\mu$m, 320 $\mu$m, 500 $\mu$m, 750 $\mu$m, 1 mm, 2 mm and 4 mm in diameter. Filaments having diameters between about 0.01 and about 10 mm may be extruded using a spinneret fabricated with the appropriate orifice diameter. The extruded filaments maintain the volume ratio of the original feed rod despite significant differences in diameters, such as a starting feed rod diameter of 22 mm and an extruded filament diameter of 250 $\mu$m (which is approximately 100 times smaller than the starting feed rod diameter). Use of thermoplastic/ceramic blends having appropriate Theological properties for the cores and shells maintain the volume ratio of the original feed rod. Preferably, the viscosity of the core material is approximately equivalent to the viscosity of the shell material. Use of core and shell materials with approximately equivalent viscosities provides improved flow stability and control to assist with maintaining the original geometry of the feed rod.

In general, filaments having diameters of no more than about 250 $\mu$m can be obtained by single filament co-extrusion. Smaller diameter green filaments may be readily broken during the winding and extrusion process, thereby limiting the ability to produce filaments having smaller diameters. To obtain cell sizes smaller than 250 $\mu$m, filaments having diameters of between about 1 to about 2 mm may be extruded and bundled together to form a multifilament feed rod having a diameter of about 22 mm. This feed rod is then extruded through a spinneret to produce multifilament spaghetti. Using this multifilament co-extrusion (MFCX) procedure, cell sizes approaching 10 microns or less can be produced.

Filaments having more than one cell composition and/or more than one shell composition can also be prepared using a modified extrusion process to provide the benefits of the properties of the additional composition and/or to insulate the shell material. As an example, a layer of a second cell composition may be disposed around the shell, such that the filament includes a central cell, an intermediate shell and an outer cell. Other combinations of cells and shells also may be prepared as desired. For example, a core material in combination with a plurality of different shells may be used.

Numerous modifications and adjustments to the process for preparing filaments may be made to allow for variations in the particular compositions used to prepare the filaments. For example, viscosities may be adjusted, the diameter of the extrusion die may be changed, or the relative volumes of the core and shell may be changed, or cross-sectional area of the die orifice may be varied or variable core and/or shell or boundary materials may be used. The configuration of the extrusion assembly also can be modified. For example, the compositions of the core and shell can be fed simultaneously to an extruder and extruded concurrently to form the green filament having a core and shell configuration. As another example, ram extrusion rather than screw extrusion can be used.

Figure 4:
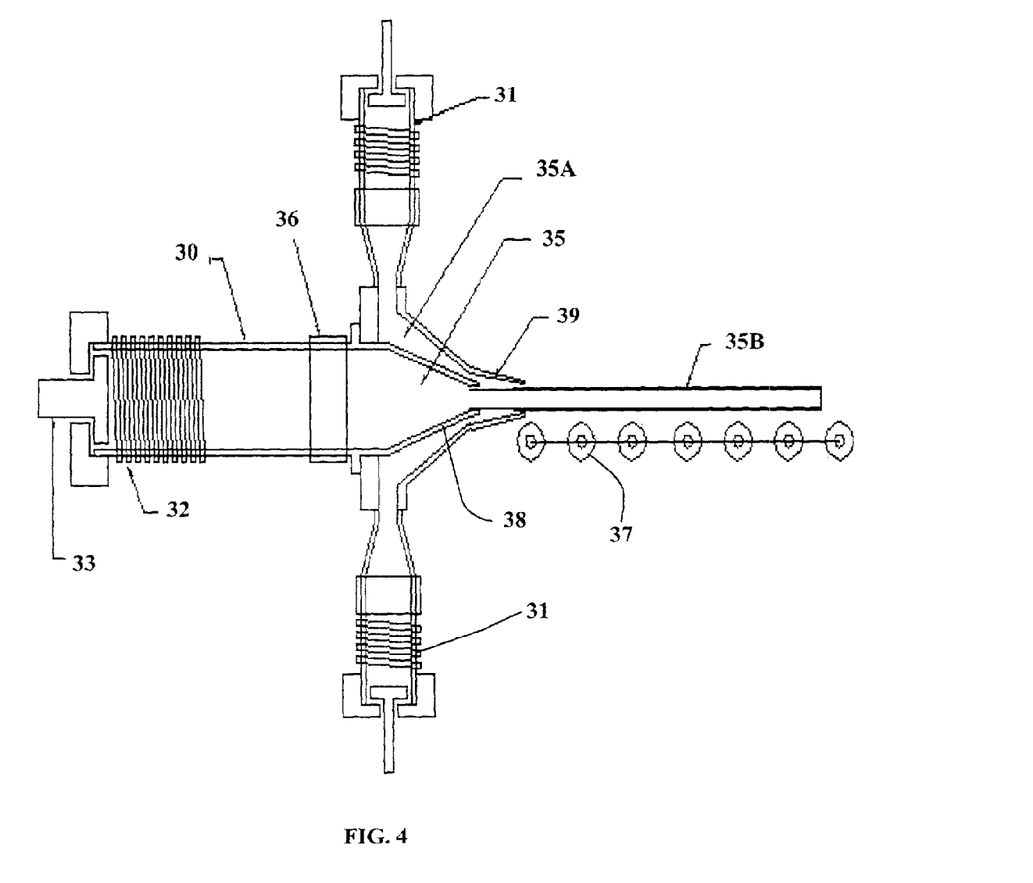
FIG. 4 is a schematic illustration of an apparatus of another embodiment of the present invention.

FIG. 4 illustrates another extrusion assembly or apparatus for preparing multi-component composite materials embodying the features of the present invention. The apparatus is a core rod feed die mechanism 30, with PLC control of the piston 33, having cooling coils 32, and heater 36, to maintain proper feed of core material 35 via co-extrusion nozzle 38. Similar feed rod dies 31 are used to feed the shell material 35A in the continuous first-pass fiber co-extrusion process via nozzle 39. The first pass fiber 35B moves along a horizontal conveyor 37. The PLC feed control extrudes a given length of fiber 35B required for the next manufacturing process, stops the feed, and the fiber 35B is cut. The continuous co-extrusion process is repeated. New extrusion core and shell material can be loaded into the cylinder of the core and shell feed die mechanisms 30, 31.

Figure 5A:
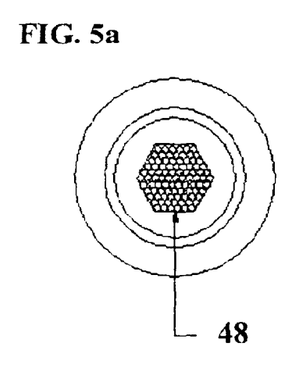
FIG. 5a is an end elevational view of a die of the apparatus of FIG. 4.
Figure 5B:
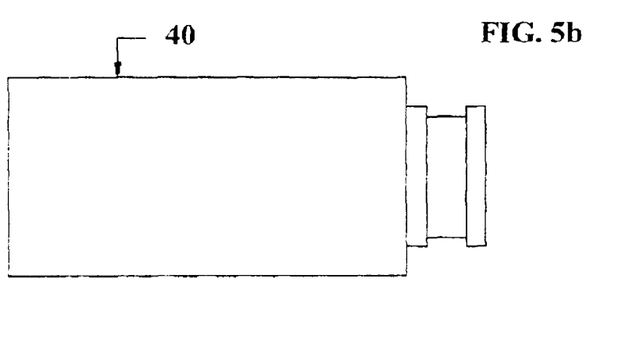

FIG. 5 illustrates an overview drawing of a hexagonal die, which is part of the alternative apparatus of FIG. 4. The cut length of first pass fiber 35B moves along the conveyor 37 to the next station in the manufacturing process. The fibers are cut again and lengths are loaded into a side load hexagonal die 40 for pressing. The hexagonal die 40 maximizes the interstitial packing of the round fibers in a die to maintain the natural 120° angle formed when round fibers are laid-up and pressed for strength and product uniformity.

The first pass fiber pressed rod 48 is next loaded into an extrusion die similar to the co-extrusion mechanism described above in FIG. 4. The second pass fibers can be produced with or without additional shell material. The net nozzle shape of the second pass fibers should be optimized for packing into dies for binder burnout to preserve the 120° interstitial bond angle to produce maximum mechanical properties in the final product. Second pass fibers move along a conveyor are cut as described above, and packed into dies for pressing into desired near-net end product shapes.

Generally, filaments may be bundled, woven, wound, braided, chopped, pressed, or laid up to produce essentially a near net shape pre-form. In a typical two-dimensional (2D) lay-up, the composite filament is wound on a computer numerically controlled (CNC) drum winder. The winder includes a rotating plastic drum driven by a servomotor from Compumotor, Rohnert Park, Calif. A single axis motion controller from Compumotor, Rohnert Park, Calif. is used to adjust the filament position as the filament is wound around the drum. Two-dimensional parts having a desired fiber alignment can be fabricated using the CNC drum winder.

After winding, composite filament sheets are cut to the desired shape and dimensions. The cut sheets can then be laid up in any standard 2D architecture (i.e. uniaxial, 0°/90°, quasi-isotropic, etc.). After the 2D pre-form is laid-up, a uniaxial platen press is used to warm laminate the component part.

In another embodiment of the present invention, the green filaments are grouped or bundled into a cylinder or other predetermined shape. The bundled filaments are cut to a predetermined length and machined, molded or otherwise formed to provide a structure having a desired shape and having the FM filaments extending generally parallel to the axis of the structure. One or more FM layers may be disposed across a surface of the structure as desired to provide increased enhancement of the mechanical properties of the structure. The FM composite structure is warm laminated to consolidate the FM filaments.

In another embodiment, the FM structure can be produced using rapid prototyping techniques as known to those skilled in the art or any modified rapid prototyping technique. For example, the feed rod can be loaded into a freeform fabrication apparatus having a heated barrel. A molten material is formed and directly feeds into a fine deposition nozzle having a volumetric flow rate that can be adjusted for high raw material throughput dispensing. The molten material is extruded through a high pressure nozzle onto a foam pad. The foam pad is mounted on a 4-axis, motorized, computer numerically controlled (CNC) platen. The solid freeform fabrication technique provides a complex part from one single, continuous fiber.

cially available from Vacuum Industries, Somerville, Mass. is capable of a maximum temperature of 2400° C. and a maximum load of 100 tons and can be operated in several different environments including vacuum, argon, and nitrogen atmospheres.

In other embodiments, alternative methods of preparing FM filaments and composite materials may be utilized. Alternative compositions and methods, including those described in the co-pending U.S. patent applications listed in Table 1, which are incorporated by reference herein in their entireties, are contemplated for use with the present invention.

TABLE 1

| TITLE | INVENTORS | FILING DATE | ATTY DOCKET NO. |
|---|---|---|---|
| ALIGNED COMPOSITE STRUCTURES FOR MITIGATION OF IMPACT DAMAGE AND RESISTANCE To WEAR IN DYNAMIC ENVIRONMENTS | Anthony C. Mulligan<br>Mark J. Rigali<br>Manish P. Sutaria<br>Dragan Popovich | Dec. 04, 2001 | 03248.00038 |
| CONSOLIDATION AND DENSIFICATION METHODS FOR FIBROUS MONOLITH PROCESSING | Manish P. Sutaria<br>Mark J. Rigali<br>Ronald A. Cipriani<br>Gregory J. Artz<br>Anthony C. Mulligan | Dec. 04, 2001 | 03248.00039 |
| METHODS AND APPARATUS FOR PREPARATION OF THREE-DIMENSIONAL BODIES | Anthony C. Mulligan<br>Mark J. Rigali<br>Manish P. Sutaria<br>Gregory J. Artz<br>Felix H. Gafner<br>K. Rani Vaidayanathan | Dec. 04, 2001 | 03248.00040 |
| COMPOSITE STRUCTURES FOR USE IN HIGH TEMPERATURE APPLICATIONS | Mark J. Rigali<br>Manish P. Sutaria<br>Greg E. Hilmas<br>Anthony C. Mulligan<br>Marlene Platero-AllRunner<br>Mark M.O Opeka | Dec. 04, 2001 | 03248.00043 |
| MULTI-FUNCTIONAL COMPOSITE STRUCTURES | Anthony C. Mulligan<br>John Halloran<br>Dragan Popovich<br>Mark J. Rigali<br>Manish P. Sutaria<br>K. Ranji Vaidyanathan<br>Michael L. Fulcher<br>Kenneth L. Knittel | Dec. 04, 2001 | 03248.00045 |

Although the invention is described with reference to generally cylindrical-shaped FM filaments that are bundled together to form FM composites wherein the shape of the filaments become essentially hexagonal in cross-section as a result of processing, other configurations are contemplated, as will be appreciated by those skilled in the art. For example, filaments having square, rectangular or triangular cross-sections may be obtained by varying the shape of the extrusion die accordingly. Additionally, the shape of the die used in the laminating step also may be modified accordingly as desired. Thus, different shapes and configurations of filaments in the FM composite may be obtained, which may impact the resultant mechanical properties of the FM composite.

A binder burnout furnace, such as commercially available from Lindberg, Watertown, Wis. is used to remove polymer binder from the formed composite coatings and FM composite structures. Sintering processes, including hot pressing or pressureless sintering, provide final consolidation and densification of the composite coatings and FM composite structures. A typical induction hot-press such as commer-

EXAMPLE

The following example is intended to illustrate the present invention and should not be construed as in any way limiting or restricting the scope of the present invention.

This example illustrates formulations for a core composition and shell composition that can be used in preparing a fibrous monolith filament in accordance with the present invention.

Example 1

A tungsten carbide material with a low cobalt content (for example, between about 0% to 6% cobalt by weight) that exhibits the mechanical properties of high hardness, wear resistance, and low toughness can be combined with a tungsten carbide material with a relatively high cobalt content (for example, between about 6% to 20% cobalt by weight) that exhibits the mechanical properties of moderate hardness, wear resistance and high toughness. The resulting FM composite exhibits improved mechanical properties as compared to the individual carbide constituents, including high hardness, excellent fracture toughness, and wear and abrasion resistance.

A multifilament tungsten carbide-3%-cobalt alloy/tungsten carbide-6%-cobalt alloy multifilament FM composite is prepared in this example. Sinterable tungsten carbide-3%-cobalt powder (particle size of about 5 μm) is blended with copolymer and plasticizer to form the FM core material according to the formulation shown in Table 2.

TABLE 2

| Material | Density (g/cc) | Volume % | Volume (cc) | Weight (g) |
| --- | --- | --- | --- | --- |
| WC-3% Co alloy[1] | 14.96 | 50.0 | 22.50 | 336.38 |
| EEA copolymer[2] | 0.93 | 42.0 | 18.90 | 17.58 |
| MPEG-550[3] | 1.100 | 8.0 | 3.60 | 3.96 |

[1]tungsten carbide-3%-cobalt alloy from Stanford Materials, designated as CB7427-Q4
[2]ethylene-ethyl acetate copolymers from Union Carbide
[3]methoxypolyethylene glycol, average molecular weight of 550 (a plasticizer)

A Brabender mixing machine is used to mix the materials. The MPEG 550 is added to adjust the blending torque of the mixture to approximately 200 kg-m². The mixture of materials can then be formed into a filament as described in detail above.

In a separate process, sinterable tungsten carbide-6%-cobalt alloy powder (particle size of about −325 mesh) is blended with co-polymers and plasticizer to form the FM shell material according to the formulation shown in Table 3.

TABLE 3

| Material | Density (g/cc) | Volume % | Volume (cc) | Weight (g) |
| --- | --- | --- | --- | --- |
| WC-6% Co alloy[1] | 14.96 | 50.0% | 22.50 | 336.38 |
| EEA copolymer[2] | 0.93 | 27.0% | 12.15 | 11.30 |
| EEA copolymer[3] | 0.93 | 18.0% | 8.10 | 7.53 |
| MPEG-550[4] | 1.100 | 5.0% | 2.25 | 2.48 |

[1]tungsten carbide-6%-cobalt alloy powder from Cerac, Inc., designated as T-1175
[2]ethylene-ethyl acetate copolymers from Union Carbide
[3]ethylene-acrylic acid copolymers from Union Carbide
[4]methoxypolyethylene glycol, average molecular weight of 550 (a plasticizer)

A Brabender mixing machine is used to mix the materials. The MPEG 550 is added to adjust the blending torque of the mixture to approximately 100 kg-m². The mixture of materials can then be used to coat the filament as described in detail above.

A 2 mm diameter tungsten carbide-3%-cobalt alloy/tungsten carbide-6%-cobalt alloy monofilament fiber is obtained and collected on a motor controlled spooler. To fabricate a multifilament fiber, the tungsten carbide-cobalt/tungsten-nickel-iron alloy monofilament fiber is cut into 82 segments of 5.5 inches each and loaded into a molding cylinder to form a multifilament feed rod. This multifilament feed rod is extruded to form a continuous length of 2 mm multifilament fiber.

The tungsten carbide-3%-cobalt alloy/tungsten carbide-6%-cobalt alloy multifilament fibers are arranged into a 1 inch wide by 3 inch long by 0.25 inch thick coupon and molded to provide a green fibrous monolith ceramic. The tungsten carbide-3%-cobalt alloy/tungsten carbide-6%-cobalt alloy multifilament fibrous monolith ceramic is heated in a furnace in a nitrogen atmosphere to remove the binder and hot pressed at 1400° C. and 2 ksi pressure to provide a sintered fibrous monolith article having core to shell ratio of about 82.5% to about 17.5%.

In the claims:

1. A method for continuous fibrous monolith composite coextrusion comprising:

a) producing a first material-laden composition comprising a thermoplastic polymer and at least about 40 volume % of a ceramic or metallic particulate;

b) extruding the first material laden composition into a filament;

c) producing a second material-laden composition comprising a thermoplastic polymer and at least about 40 volume % of a ceramic or metallic particulate that is different in composition than the first material laden composition;

d) passing the filament through an coextrusion assembly, the coextrusion assembly comprising an extrusion head, a tapered nozzle, a spinnerette, a spinnerette housing, a guide rod support, and a guide rod;

e) coating the filament with the second material-laden composition as the filament passes through the coextrusion assembly to form a coated filament;

f) arranging the coated filament into a desired architecture to form a fibrous monolith composite.

2. A method for continuous formation of a fibrous monolith material comprising steps of:

a) forming an elongate filament of a cell material;

b) continuously feeding the filament of cell material through a first nozzle opening of a first nozzle member into a chamber;

c) continuously extruding a boundary material into said chamber and about the cell material as the cell material is discharged from the first nozzle opening;

d) continuously extruding the composite cell and boundary material from the chamber through a second nozzle opening to form an extrudate of fibrous monolith material.

3. The process of claim 2 wherein the second nozzle opening is larger in cross-sectional area than the cross-sectional area of the first nozzle opening.

4. The process of claim 2 including a first nozzle member having a conical outside surface and with a central discharge first nozzle opening.

5. The process of claim 2 including a second nozzle member having a conical passage with a narrow discharge end comprising the second nozzle opening.

6. The process of claim 2 wherein the filament is formed by compressing a cell material in a chamber through the first nozzle opening.

7. The process of claim 2 wherein the first nozzle opening is circular.

8. The process of claim 2 wherein the second nozzle opening is circular.

9. The process of claim 2 wherein the first nozzle opening is polygonal.

10. The process of claim 2 wherein the second nozzle is polygonal.

11. The process of claim 3 wherein cell material is selected from the group consisting of metal, metal alloy, carbide, nitride, boride, oxide, phosphate and silicide.

12. The process of claim 2 wherein the boundary material is selected from the group consisting of metal, metal alloy, carbide, nitride, boride, oxide, phosphate and silicide.

13. The process of claim 2 wherein the first nozzle opening includes means for adjusting the area of said opening.

14. The process of claim 2 wherein the second nozzle opening includes means for adjusting the area of said opening.

15. The process of claim 2 including the step of injecting a second boundary material into the chamber continuously simultaneously with said first boundary material.

16. The process of claim 2 including the step of injecting an additional material into the chamber in contact with the boundary material only.

17. The process of claim 2 including the step of injecting an additional material into the chamber in contact with both the cell and boundary material.

18. The process of claim 2 including the step of simultaneously feeding a second cell material into the chamber with the first cell material.

\* \* \* \* \*